April 3, 1956 G. C. STURGES 2,740,372
LIGHTING SYSTEM FOR INDICATING INSTRUMENTS
Filed Sept. 29, 1952 2 Sheets-Sheet 1

INVENTOR.
GEORGE C. STURGES
BY
C. R. Miranda
ATTORNEY

April 3, 1956 G. C. STURGES 2,740,372
LIGHTING SYSTEM FOR INDICATING INSTRUMENTS
Filed Sept. 29, 1952 2 Sheets-Sheet 2

INVENTOR.
GEORGE C. STURGES
BY
C. R. Miranda
ATTORNEY

United States Patent Office 2,740,372
Patented Apr. 3, 1956

2,740,372

LIGHTING SYSTEM FOR INDICATING INSTRUMENTS

George C. Sturges, Bergenfield, N. J., assignor to Bendix Aviation Corporation, Teterboro, N. J., a corporation of Delaware Application September 29, 1952, Serial No. 312,072

10 Claims. (Cl. 116—133)

The present invention relates to indicating instruments and more particularly to lighting systems for such instruments.

Proper illumination of indicating instruments, which are used in control compartments of mobile craft, becomes exceedingly important where a very low level of illumination must be maintained in the compartment and the operator must control the craft under "night-vision" conditions. Generally, such instruments are properly illuminated by some method of internal lighting but where the instrument is other than a dial type instrument which utilizes a flat dial, for example, the problem of proper illumination is not easily solved. In the above dial type instrument, a source of illumination is positioned to direct light rays into the flat dial and also across the face of the dial to illuminate a pointer rotatable in a plane above the dial. Where the dial or indicia bearing member is curved or, arcuate shaped, and an indicator movable above and following the curvature of the curved face of the member is provided, adequate illumination of both curved member and indicator cannot be obtained with the above described lighting arrangement.

One object of the present invention is to provide a novel lighting system for adequately illuminating an indicator which moves in a curved or arcuate path.

Another object is to provide a novel lighting system for properly illuminating a curved indicia bearing member and a transparent indicator from the same source of illumination.

A further object is to provide a novel lighting system for illuminating a curved indicia bearing member and a transparent indicator which moves in a path following the curvature of the indicia bearing member.

A still further object is to provide a novel lighting system for illuminating a pivotally mounted and transparent indicator which moves in a curved path, and comprises a curved plate member of light transmitting material having light deflecting means and a light reflecting surface for transmitting the light rays from a source of illumination to a transparent indicator in all positions thereof in the curved path.

The present invention, therefore, contemplates a novel lighting system for adequately illuminating a movable and transparent indicator which moves in an arcuate path along a curved indicia bearing member. Means are provided for illuminating both the indicia and the indicator and comprise a curved plate member of light transmitting material having light deflecting means which deflects light rays to a reflecting surface where it is reflected externally of the plate member to illuminate the indicator in all positions relative to the indicia bearing member and a portion of the light rays, not deflected by the light deflecting means, illuminating the indicia.

The above and other objects and advantages of the present invention will appear more fully hereinafter from a consideration of the detailed description which follows taken together with the accompanying drawings wherein one embodiment of the invention is illustrated.

Figure 1:
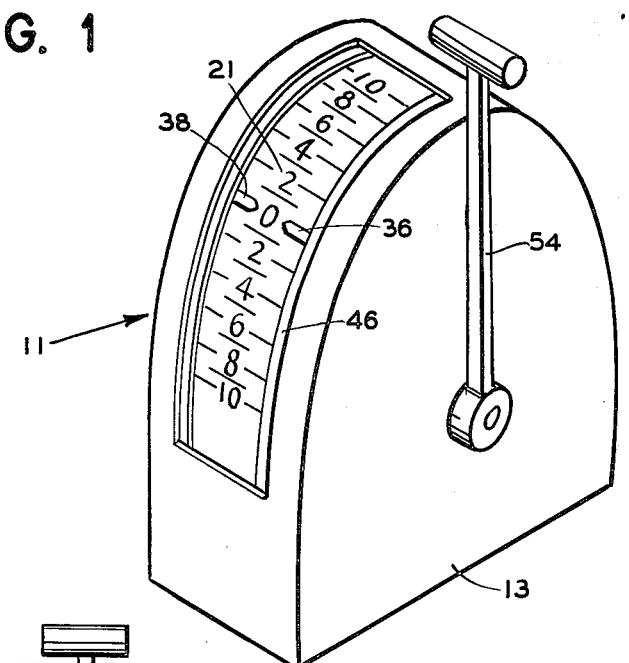
Figure 1 is an isometric view, in elevation, of one form of an indicating instrument embodying the present invention.

Referring now to the drawings for a more detailed description of the present inveniton, and more particularly to Figure 1, wherein one form of an instrument embodying the invention is shown, an indicating instrument, generally designated by the numeral 11, comprises a housing 13. Fixedly mounted in housing 13 by suitable means (not shown) is a curved or arcuate shaped lighting plate member 15 of colorless transparent material which is capable of transmitting light. The material may be an acrylic resin, for example, which has the property of total reflection such that internal light may be transmitted around bends. Plate 15 has upper and lower polished face surfaces 16 and 16A, respectively, which are equidistant from or parallel to each other throughout their lengths. Upper face surface 16 has an edge 17 on each side of an imaginary longitudinal center line 18 arranged parallel to each other and a pair of edges 19 extending transversely of the center line. The upper face surface 16 has secured thereto a dial plate member 20 (Figures 2 and 3) which covers the upper face surface of arcuate member 15 to such an extent as to leave exposed a marginal area along the edges 17 of upper face surface 16.

The body of dial plate 20 is capable of transmitting light and may be of the same material as that of plate 15. Provided on dial plate 20 are indicia 21 (Figure 1) which may be photoengraved thereon or formed by other suitable methods of forming indicia, the only requirement being that the indicia be translucent, preferably white, with an opaque background so as to be capable of illumination by light transmitted through the dial plate by internal reflection.

Member 15 has a plurality of apertures 22 each of which accommodates a lamp 23 mounted in a conventional lamp socket 24 connected to a suitable source of energy (not shown). A pair of the apertures are arranged adjacent both edges 19 and lamps 23 are so positioned therein as to direct light rays through a red filter 26 and into the body of the lighting plate.

Figure 4:
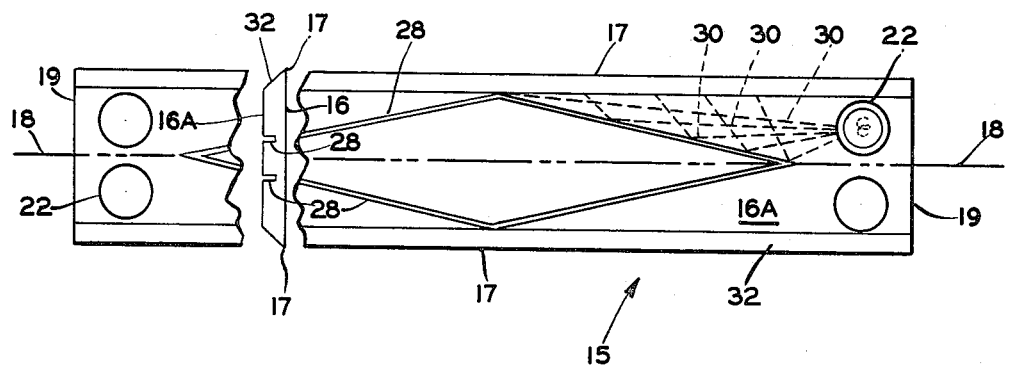
Figure 4 is a view of the underside of the arcuate lighting plate of Figure 3, the plate being shown straightened to more clearly illustrate the light deflecting means of the present invention.

Light deflecting or reflecting means, such as a plurality of oblique grooves 28 are cut in the underside or through the lower face of lighting plate 15 to a depth slightly greater than half the thickness of the plate. The grooves form a diamond shaped figure or rhombus and the points at which the grooves meet to form the acute angles of the diamond are located adjacent to the apertures and on the longitudinal center line 18, while the points at which the grooves meet to form the obtuse angles are located at the middle of the plate and adjacent the parallel edges 17 (Figure 4). Grooves 28 are inclined toward the longitudinal center line 18 to provide a deflecting barrier to the light rays which emanate radially from the lamps and travel in a direction going away from the transversely extending edges 19. By slanting the grooves in the manner shown in Figure 4, a portion of the rays, that is those which travel through the lighting plate between the lower face of the lighting plate and the uppermost part of the grooves, are deflected and directed through the body of the lighting plate and toward parallel edges 17. The light rays from one lamp only are shown in Figure 4, the rays to be deflected being designated by the numeral 30. It is apparent that the arrangement of the grooves provides for a maximum number of light rays 30 to be deflected toward edges 17 of the plate and along substantially the entire length thereof. Grooves 28 do not extend to the upper face surface of lighting plate 15 and for this reason undeflected light rays from the lamps are permitted to pass through the part of the plate body above the grooves so that they may enter dial plate 20 and thereby illuminate indicia 21.

Formed along the parallel edges 17 of lighting plate 15 and arranged immediately below the exposed marginal areas on the upper face surface of the plate are light reflecting surfaces 32 which preferably have a 45 degree bevel. The exposed marginal surface areas serve to emit light rays reflected from surfaces 32 and will be hereinafter referred to as light emitting surfaces and designated by the numeral 34. Arranged to travel above lighting plate 15 and in a path following the curvature of the plate are a pair of finger shaped indicators 36 and 38 of colorless and transparent material. Indicators 36 and 38 each have a light admitting surface 40 and a part coated with white paint 42, the thickness of the paint being shown exaggerated for purposes of illustration.

Light rays 30 are reflected by the beveled reflecting surfaces 32 and transmitted through the light emitting surfaces 34 and light admitting surfaces 40, and into indicators 36 and 38. The rays entering the indicators are internally reflected therein and diffused by paint 42 to become visible to an observer.

Figure 2:
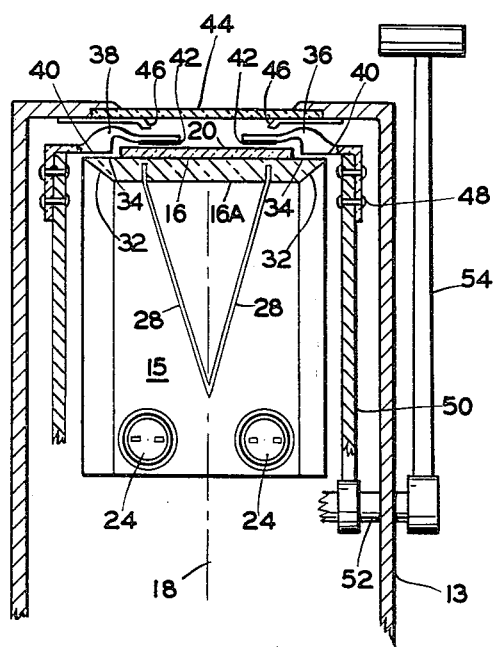
Figure 2 is an elevatioanl view, in section, of a portion of the indicating instrument of Figure 1.
Figure 3:
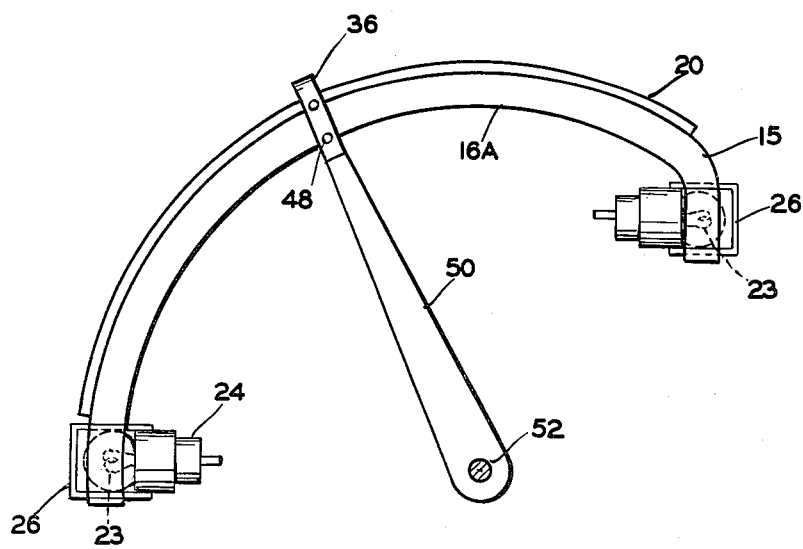
Figure 3 is a side elevational view of the curved lighting plate and indicator of the present invention.

The painted parts of indicators 36 and 38 are exposed to view through a transparent glass cover 44 shown in Figure 2. A bezel 46 (Figure 2) extends above and beyond the light emitting surfaces 34 to prevent stray light from escaping externally of the housing. Thus, in a darkened compartment wherein the instrument 11 is located, an observer can see only the painted portion of the indicators as well as the indicia 21. From the arrangement thus far described it may be understood that the dial plate and indicators will be adequately illuminated from the same source of illumination and further, that the indicators will be illuminated in all positions relative to dial plate 20.

Indicator 36 is secured by way of rivets 48 to an arm 50 fastened to a rotatable shaft 52 which extends outside housing 13. A control handle 54 is affixed to the externally projecting end of shaft 52 and displacement of the handle provides for movement of indicator 36 above the dial plate and between the graduations coinciding with the numeral "10," above and below the zero indication. Indicator 38 follows-up the movement of indicator 36, by means not shown, to be aligned therewith whenever the latter is displaced. Since the means which provide for follow-up movement of indicator 38 do not form any part of the present invention, and are not necessary to an understanding thereof, further description of such means is believed unnecessary.

It is to be understood that the present invention is not limited to a lighting system for an instrument, such as instrument 11, but may be employed in any instrument which requires illumination of a curved indicia bearing member and a transparent indicator movable along a path following the curvature of the curved member.

It will now be apparent that the present invention provides novel illumination means for properly illuminating a curved indicia bearing member and a transparent indicator movable above the member. By providing light deflecting means, such as grooves, in a lighting plate member and beveled reflecting surfaces, the indicia of a curved dial plate member and a transparent indicator movable over the curved face of the dial plate member may be both illuminated by light rays from the same source of illumination.

The present invention also contemplates arrangement of indicia directly on the lighting plate member rather than on a separate dial plate member; the latter arrangement is described herein as a preferred embodiment. Further, the light deflecting means do not have to be grooves cut in the lighting plate but may be any other light deflecting or reflecting means, such as, for example, strips of light reflective material molded in the plate.

Although one embodiment of the invention has been illustrated and described in detail, it is to be expressly understood that the invention is not limited thereto. Various changes can be made in the design and arrangement of parts without departing from the spirit and scope of the invention as the same will now be understood by those skilled in the art.

I claim:

1. In combination with an arcuate and transparent dial provided with indicia thereon and a transparent indicator for said indicia disposed adjacent said dial for motion relative thereto, a light source directing rays of light into said dial so that some of said rays illuminate said indicia, means comprising a groove formed in said dial for intercepting other of said rays and directing them toward a part of said dial, and an inclined surface formed at said part for receiving the directed rays and transmitting them toward the indicator to illuminate the latter.

2. In combination with an arcuate and transparent dial provided with indicia thereon and a transparent indicator for said indicia adapted for motion along a path substantially uniformly equidistant from an edge of said dial, a light source directing rays of light into said dial so that a portion of said rays illuminate said indicia, means comprising a groove formed in said dial and arranged obliquely with respect to said edge for intercepting another portion of said rays and directing them toward said edge, and a surface formed at said edge for receiving the directed light rays and transmitting them toward the indicator to illuminate the latter.

3. In combination with an arcuate and transparent dial provided with indicia thereon and a transparent indicator adjacent said dial and arranged for motion relative thereto, said dial having spaced substantially uniformly equidistant upper and lower arcuate surfaces, the upper face surface having a pair of spaced substantially uniformly equidistant edges, a light source positioned adjacent an end of said dial and directing light rays into the latter for illuminating the indicia thereof, a groove formed in said dial and arranged obliquely with respect to one of said edges and extending to a point adjacent said end of the dial, said groove intercepting other rays in said dial from said source and directing them toward said one edge, and an inclined surface formed at said one edge and receiving the directed rays and transmitting them toward the indicator to illuminate the latter.

4. An illuminated device of the class described comprising an arcuate and transparent dial provided with indicia thereon and having a pair of spaced substantially uniformly equidistant edges, a transparent indicator spaced from each edge of said dial and arranged for motion relative thereto, a light source adjacent each of said edges and directing rays into said dial for illuminating the indicia thereof, a groove associated with each of said edges and formed in said dial and inclined toward a light source for intercepting a portion of said rays and directing them toward said edges, and an inclined surface formed at each of said edges for receiving the directed light rays and transmitting them toward the indicators to illuminate the latter.

5. An illuminated device of the class described comprising an arcuate and transparent dial provided with indicia thereon and having a pair of spaced parallel arcuate edges, a transparent indicator spaced from each edge of said dial and arranged for motion relative thereto, a light source adjacent each end of the dial and directing rays of light into said dial for illuminating the indicia thereof, a plurality of grooves in said dial forming a diamond shape figure with each of the obtuse angles thereof being located adjacent a respective one of said edges and each of the acute angles being located adjacent a respective one of said ends, said grooves intercepting a portion of the light rays and directing them toward the edges of said dial, and an inclined surface formed at said edges for receiving the directed rays and transmitting them toward the indicators to illuminate the latter.

6. In combination, arcuate light conductive dial means provided with indicia on an arcuate surface thereof, an indicator adjacent said dial means adapted for movement relative to said indicia, means for directing rays of light into said dial means so that a portion of said rays illuminate said indicia, means in said dial means for intercepting another portion of said rays and directing them toward a part of said dial means normally not traversed by said intercepted rays, and means for receiving the directed rays and redirecting them toward said indicator to illuminate said indicator.

7. In combination, arcuate light conductive dial means having indicia on an arcuate surface thereof and having an edge, a transparent indicator adapted for movement with respect to said indicia along a path substantially uniformly equidistant from said edge, a light source directing rays of light into said dial means so that some of said rays illuminate said indicia, means in said dial for intercepting other of said rays and directing them generally toward said edge, and an inclined surface formed adjacent said edge for receiving the directed rays and reflecting them toward said indicator to illuminate said indicator.

8. In combination with an arcuate and transparent dial provided with indicia on an arcuate surface thereof and a transparent indicator for said indicia spaced from an edge of said dial and arranged for motion relative thereto, said dial having inner and outer arcuate surfaces which are spaced substantially equidistant from each other throughout their lengths, a light source directing rays of light into said dial for illuminating the indicia thereof, a groove cut in said inner surface and terminating short of said outer surface, said groove intercepting other rays in said dial from said source and directing them in the general direction of said edge, and means adjacent said edge for receiving the directed rays and transmitting them toward the indicator to illuminate the latter.

9. In combination, arcuate light-conductive dial means having inner and outer arcuate surfaces which are spaced substantially equidistant from each other throughout their lengths, indicia on said outer surface and extending along the length thereof in the field of view of the observer, said outer surface having a marginal portion along the length thereof between one edge thereof and said indicia and substantially hidden from the field of view of the observer, an indicator adapted for movement along an arcuate path in front of said outer surface and adjacent to said indicia in the field of view of the observer, a light source for directing rays of light into said dial means so that some of said rays illuminate said indicia, means comprising a groove formed in said dial and arranged in a generally oblique direction with respect to said edge for intercepting other light rays from said source and redirecting said intercepting rays, and means for directing said redirected rays so that they pass through said marginal portion, whereby an effective reservoir of light substantially hidden from the field of view of the observer is distributed along said marginal portion for illuminating said indicator at all positions of said indicator along its arcuate path of travel.

10. In combination, arcuate transparent dial means having inner and outer arcuate surfaces which are spaced substantially equidistant from each other throughout their lengths, light-conductive indicia with an opaque background on said outer surface and extending along the length thereof in the field of view of the observer, said outer surface having a marginal portion along the length thereof between one edge thereof and said indicia and substantially shielded from the field of view of the observer, said inner surface having an edge disposed substantially behind said edge of said outer surface, a light-conductive indicator having a portion for receiving light and an end portion for releasing the received light and adapted for movement along an arcuate path in front of said outer surface so that said light-admitting portion moves in front of said marginal portion and said end portion moves adjacent to said indicia in the field of view of the observer, a light source for directing rays of light into said dial means so that some of said rays illuminate said indicia, means comprising a groove formed in said inner surface and arranged in a generally oblique direction with respect to the edge thereof for intercepting other light rays from said source and directing them generally toward said last-mentioned edge, and reflecting means adjacent said last-mentioned edge for redirecting said directed light so that it passes through said marginal portion, whereby an effective arcuate reservoir of light substantially shielded from the field of view of the observer is continuously present along said marginal portion for passage into said light-admitting portion of said indicator at all positions of said indicator along its arcuate path of travel.

References Cited in the file of this patent

UNITED STATES PATENTS

| | | |
|---|---|---|
| 2,159,095 | Madan | May 23, 1939 |
| 2,328,485 | Ott | Aug. 31, 1943 |
| 2,561,885 | Prideaux | July 24, 1951 |
| 2,566,026 | Hughes | Aug. 28, 1951 |
| 2,594,081 | Shlenker | Apr. 22, 1952 |
| 2,602,036 | Sullivan | July 1, 1952 |